(12) United States Patent
Jiang et al.

(10) Patent No.: US 11,789,197 B2
(45) Date of Patent: Oct. 17, 2023

(54) LIGHT SOURCE MODULE FOR ATMOSPHERE LIGHT AND AMBIENT GLASS

(71) Applicant: FUYAO GLASS INDUSTRY GROUP CO., LTD., Fujian (CN)

(72) Inventors: Bingming Jiang, Fujian (CN); Jiarong Ye, Fujian (CN); Zhixin Wang, Fujian (CN); Yunxiang Ye, Fujian (CN); Xueping Chen, Fujian (CN); Xianping Liu, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 0 days.

(21) Appl. No.: 17/978,265

(22) Filed: Nov. 1, 2022

(65) Prior Publication Data
US 2023/0053295 A1     Feb. 16, 2023

Related U.S. Application Data

(63) Continuation of application No. PCT/CN2021/102866, filed on Jun. 28, 2021.

(51) Int. Cl.
*F21V 8/00*         (2006.01)
*B60Q 3/208*        (2017.01)
(Continued)

(52) U.S. Cl.
CPC .......... *G02B 6/0073* (2013.01); *B60Q 3/208* (2017.02); *B60Q 3/62* (2017.02); *B60Q 3/70* (2017.02)

(58) Field of Classification Search
CPC ........ G02B 6/0073; B60Q 3/208; B60Q 3/62; B60Q 3/70
(Continued)

(56) References Cited

U.S. PATENT DOCUMENTS 8,322,902 B2 * 12/2012 Martin ................. G02B 6/0035
                                                362/540
2005/0018441 A1    1/2005 Menke, III et al.
(Continued)

FOREIGN PATENT DOCUMENTS

CN        104315418 A      1/2015
CN        105235481 A      1/2016
(Continued)

OTHER PUBLICATIONS

International Search Report dated Sep. 27, 2021 issued in PCT/CN2021/102866.
(Continued)

*Primary Examiner* — Laura K Tso

(74) *Attorney, Agent, or Firm* — Scully, Scott, Murphy & Presser, P.C.

(57) ABSTRACT

A light source module for an atmosphere light and an ambient glass are provided. The light source module is disposed at an edge of a light-guiding glass. The light source module includes multiple light-guiding blocks and light-emitting diodes (LEDs). The multiple light-guiding blocks are arranged along a side edge of the light-guiding glass to constitute a curved light-guiding structure, and the curved light-guiding structure has a radian matching the side edge of the light-guiding glass. The LEDs are disposed at at least one end of the curved light-guiding structure, and lights emitted by the LEDs are uniformly dispersed by the light-guiding structure to be incident into the light-guiding glass.

19 Claims, 4 Drawing Sheets

(51) Int. Cl.
B60Q 3/62 (2017.01)
B60Q 3/70 (2017.01)

(58) Field of Classification Search
USPC .......................................................... 362/511
See application file for complete search history.

(56) References Cited

U.S. PATENT DOCUMENTS

| | | |
|---|---|---|
| 2011/0227487 A1 | 9/2011 | Nichol et al. |
| 2019/0368680 A1 | 12/2019 | Belitz et al. |
| 2019/0383991 A1* | 12/2019 | Que .................... G02B 6/0068 |

FOREIGN PATENT DOCUMENTS

| | | |
|---|---|---|
| CN | 107167867 A | 9/2017 |
| CN | 207921886 U | 9/2018 |
| CN | 108954214 A | 12/2018 |
| CN | 109624837 A | 4/2019 |
| CN | 111559310 A | 8/2020 |

OTHER PUBLICATIONS

Chinese First Office Action dated Apr. 1, 2021 issued in CN 202010395904.4.

* cited by examiner

LIGHT SOURCE MODULE FOR ATMOSPHERE LIGHT AND AMBIENT GLASS

CROSS-REFERENCE TO RELATED APPLICATIONS

This application is a continuation of International Application No. PCT/CN2021/102866, filed Jun. 28, 2021, which claims priority to Chinese Patent Application No. 202010395904.4, filed May 12, 2020, the entire disclosures of which are incorporated herein by reference.

TECHNICAL FIELD

This disclosure relates to the field of multifunctional glasses, and in particular to a light source module for an atmosphere light and an ambient glass.

BACKGROUND

A vehicle sunroof mounted with an atmosphere light has been widely used in a technical field of vehicle sunroofs of middle or high-class vehicles due to unique illuminating and decorative effect of the vehicle sunroof, which makes a vehicle more gorgeous at night and can play a role in setting off atmosphere and creating mood inside the vehicle. A vehicle sunroof with an atmosphere light commonly used in the related art includes a light-guiding glass and a light source module which is mounted at an edge of a window glass. A reflective element is disposed on a surface of the light-guiding glass, such that an effect of a planar light source is formed on a surface of the entire light-guiding glass, thereby realizing uniform illumination in a vehicle window.

A light source module of an existing ambient glass mainly has a long light-guiding structure, that is, according to a curvature of an arc surface of a glass, a light-guiding strip with a corresponding radian is developed, and then light-emitting diode (LED) light sources are placed at two ends of the light-guiding strip. The light-guiding strip is lit up through the LED light sources, and then lights are transferred to the glass, such that an atmosphere-light effect is realized. Alternatively, a printed circuit board assembly (PCBA) board mounted with LEDs is vertically placed, and a light-guiding structure with a corresponding radian is added in front of the PCBA board. The LEDs are arranged on the PCBA board at regular intervals, and the PCBA board is developed into a corresponding shape according to the curvature of the glass, and lights are emitted by the LEDs and then incident into the glass through the light-guiding structure.

A curved light-guiding strip used in the related art is relatively expensive in manufacture costs of a mold, which is not beneficial to a later mold modification. The curved light-guiding strip is not universal, and different light-guiding glasses have different curvatures and need to use curved light-guiding strips with different radians, such that costs of product development are increased. The curved light-guiding strip requires high precision in a manufacture process, local mismatches will affect an entire light-guiding effect, and local correction and adjustment are unable to be performed.

SUMMARY

A light source module for an atmosphere light is provided in a first aspect of implementations of the present disclosure. The light source module for an atmosphere light is disposed at an edge of a light-guiding glass. The light source module includes multiple light-guiding blocks and light-emitting diodes (LEDs). The multiple light-guiding blocks are arranged along a side edge of the light-guiding glass to constitute a curved light-guiding structure, and the curved light-guiding structure has a radian matching the side edge of the light-guiding glass. The LEDs are disposed at at least one end of the curved light-guiding structure, and lights emitted by the LEDs are uniformly dispersed by the light-guiding structure to be incident into the light-guiding glass.

An ambient glass is further provided in a second aspect of implementations of the present disclosure. The ambient glass includes a light-guiding glass printed with a reflective pattern and a light source module. The light source module for an atmosphere light is disposed at an edge of a light-guiding glass. The light source module includes multiple light-guiding blocks and LEDs. The multiple light-guiding blocks are arranged along a side edge of the light-guiding glass to constitute a curved light-guiding structure, and the curved light-guiding structure has a radian matching the side edge of the light-guiding glass. The LEDs are disposed at at least one end of the curved light-guiding structure, and lights emitted by the LEDs are uniformly dispersed by the light-guiding structure to be incident into the light-guiding glass. The LEDs are configured to emit uniform lights from an edge of the light-guiding glass to an interior of the light-guiding glass.

BRIEF DESCRIPTION OF THE DRAWINGS

In order to explain technical solutions in implementations of the present disclosure more clearly, the following will describe accompanying drawings used for the implementations of the present disclosure.

REFERENCE SIGNS

1, light-guiding glass; 2, light-guiding block; 3, curved light-guiding structure; 4, LED; 5, curved circuit board; 6, cover plate; 7, exterior glass; 8, adhesive; accommodation cavity 9; 21, column; 22, concave portion; 23, light incident surface; 24, reflecting surface; 25, light outlet surface; 26, protrusion; 41, light-emitting surface; 51, through hole; 61, clamping portion; d, distance.

DETAILED DESCRIPTION

In order to elaborate technical contents, realized objectives, and effects of the present disclosure, the following will further explain the present disclosure in combination with accompanying drawings and implementations. Apparently, implementations described herein are merely some implementations, rather than all implementations, of the present disclosure.

In the present disclosure, orientations or positional relationships indicated by terms "up", "down", etc., are all based on orientations or positional relationships illustrated in the accompanying drawings. These terms are mainly used to better describe the present disclosure and implementations thereof, and are not used to limit that an indicated device, element, or component must have a specific orientation, so these terms cannot be construed as limiting the present application.

Figure 1:
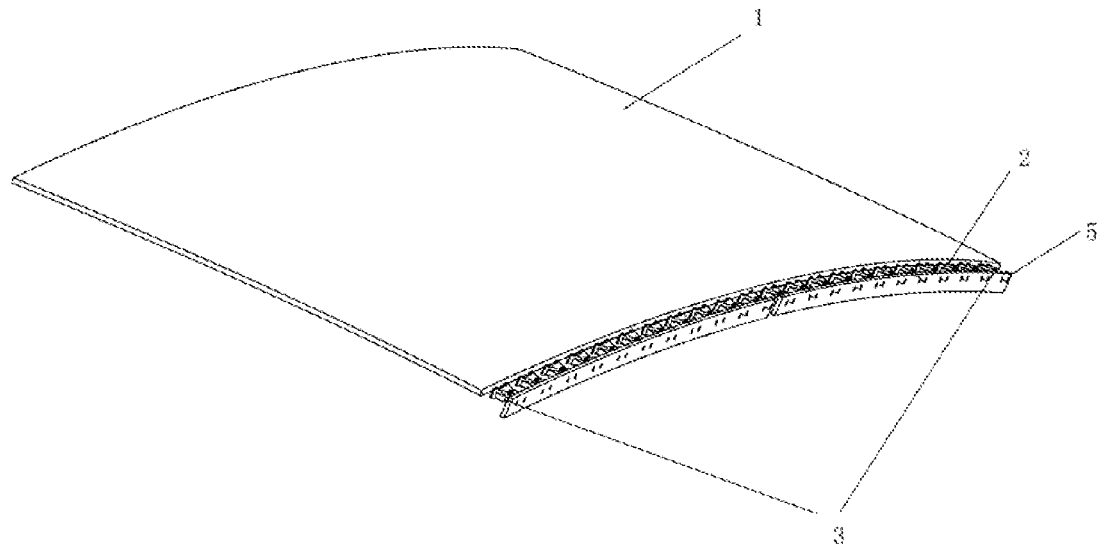
FIG. 1 is a schematic diagram of an ambient glass of the present disclosure.
Figure 2:
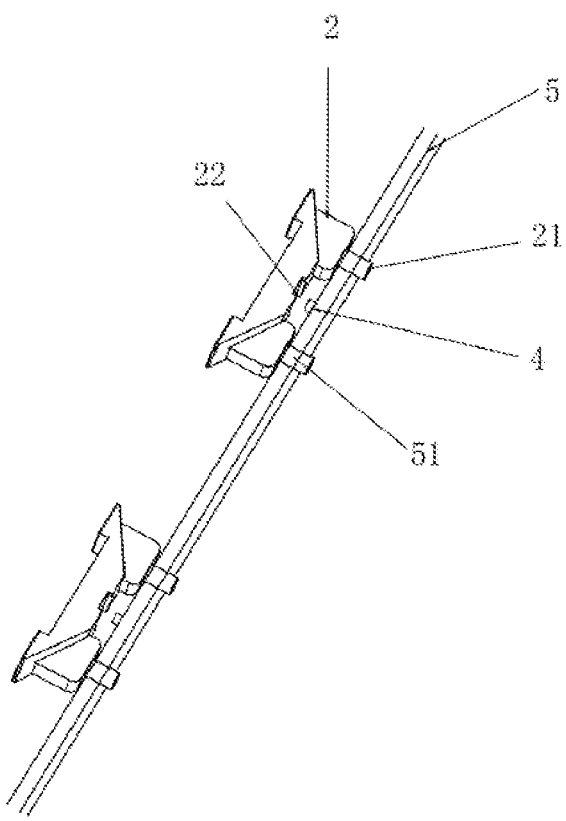
FIG. 2 is a schematic diagram of a light-guiding block of the present disclosure.

Referring to FIG. 1, a light source module for an atmosphere light is provided in the present disclosure, and the light source module is disposed at an edge of a light-guiding glass 1. The light source module includes multiple light-guiding blocks 2 and light-emitting diodes (LEDs) 4. The multiple light-guiding blocks 2 are arranged along a side edge of the light-guiding glass 1 to constitute a curved light-guiding structure 3, and the curved light-guiding structure 3 has a radian matching the side edge of the light-guiding glass 1. The LEDs 4 are disposed at at least one end of the curved light-guiding structure 3, and lights emitted by the LEDs 4 are uniformly dispersed by the light-guiding structure 3 to be incident into the light-guiding glass 1.

In the present disclosure, the light-guiding glass 1 may be a toughened or an ordinary inorganic glass, or an organic glass. An entire safety of a glass can be improved by selecting a structure of a laminated glass. The light-guiding glass 1 is a curved glass, and light-guiding glasses 1 of different vehicle models have different curvatures. In the present disclosure, each light-guiding block 2 is a transparent optical element made of a light-guiding material, preferably polycarbonate (PC) or poly(methyl methacrylate) (PMMA). The multiple light-guiding blocks 2 are disposed at the side edge of the light-guiding glass 1. In an idea of dividing the whole into parts, multiple independent light-guiding blocks 2 are arranged and combined to constitute the curved light-guiding structure 3, and the curved light-guiding structure 3 refers to a light-guiding-block set composed of all light-guiding blocks 2. In this way, multiple independent light-guiding blocks 2 are combined to constitute the curved light-guiding structure 3, so a position and an angle of each independent light-guiding block 2 can be adjusted according to curvatures of different light-guiding glasses 1 to adjust the radian of the curved light-guiding structure 3 to match glasses with different curvatures, such that the multiple light-guiding blocks 2 are universal and different light-guiding strips need not to be developed for different types of light-guiding glasses 1.

The LEDs 4 are light source elements that provides light for a glass. In an implementation, the LEDs 4 can be disposed at two ends of the curved light-guiding structure 3 as in a conventional solution. Referring to the related art, the LEDs 4 are disposed at two ends of a light-guiding strip, and lights are transmitted from the two ends of the light-guiding strip to a middle of the light-guiding strip, such that a light intensity at a position away from the two ends is bound to be attenuated.

In an implementation of the present disclosure, referring to FIG. 1, the light source module further includes at least one curved circuit board 5, and a circuit is disposed on a surface of the at least one curved circuit board 5. The LEDs 4 are uniformly distributed on the surface of the at least one curved circuit board 5, and the LEDs 4 are coupled with an external power source through the circuit on the surface of the at least one curved circuit board 5, such that the external power source can supply power to the LEDs 4 to make the LEDs 4 emit lights. In the implementation, the number of the LEDs 4 is equal to the number of the multiple light-guiding blocks 2. It can be understood that in other implementations, the number of the LEDs 4 may also be greater than the number of the multiple light-guiding blocks 2 to enhance an effect of adjusting atmosphere. The at least one curved circuit board 5 and the curved light guiding structure 3 can either form a directly fixed connection structure, or a relatively fixed connection structure, that is, the at least one curved circuit board 5 and the curved light-guiding structure 3 are fixed relative to each other through being fixed to other structures. In FIG. 1, the at least one curved circuit board 5 is implemented as two curved circuit boards 5, and the two curved circuit boards 5 are spliced to cover an entire curved light-guiding structure 3. A single curved circuit board 5 may also be used to cover the entire curved light-guiding structure 3. However, a radian and a length of a single curved circuit board 5 can be reduced and a difficulty of preparing the single curved circuit board 5 can be reduced by using multiple curved circuit boards 5. The LEDs 4 are uniformly distributed at the at least one curved circuit board 5, and at least one LED 4 exists between each light-guiding block 2 and the at least one curved circuit board 5.

In the above implementation, referring to FIG. 2 to FIG. 5, each light-guiding block 2 defines a concave portion 22, each LED 4 protrudes from the surface of the at least one curved circuit board 5, and each protrusion LED 4 is just accommodated in the concave portion 22 of each light-guiding block 2, such that a distance between each light-guiding block 2 and the at least one curved circuit board 5 is shortened, and more lights emitted by each LED 4 enter each light-guiding block 2, which enhances an luminous effect.

In the above implementation, referring to FIG. 2 to FIG. 5, the multiple light-guiding blocks 2 each are designed to have a protrusion column 21, the at least one curved circuit board 5 defines through holes 51 corresponding to the columns 21, and the column 21 of each light-guiding block 2 penetrates through each through hole 51 to make each light-guiding block 2 fixedly connected with the at least one curved circuit board 5. Specifically, the column 21 can be fixed to the at least one curved circuit board 5 by a hot staking process.

In the above implementation, the at least one curved circuit board 5 is disposed on a surface of the curved light-guiding structure 3 away from the side edge of the light-guiding glass 1. In other words, a plane where the surface of the at least one curved circuit board 5 is located may be substantially regarded as a plane perpendicular to the light-guiding glass 1, or the surface of the at least one curved circuit board 5 is substantially parallel to a plane where the light-guiding glass 1 is located and a side surface of the at least one curved circuit board 5 is opposite to the side edge of the light-guiding glass 1, that is, for example, referring to FIG. 9, a distance exists between the side surface of the at least one curved circuit board 5 and the side edge of the light-guiding glass 1 in the horizontal direction.

In the above implementation, referring to FIG. 6 to FIG. 9, each LED 4 includes a light-emitting surface 41, each light-guiding block 2 includes a light incident surface 23, and the light incident surface 23 faces the light-emitting surface 41, a projection of the light incident surface 23 on a plane parallel to the light-emitting surface 41 overlaps a projection of the light-emitting surface 41 on the plane parallel to the light-emitting surface 41, and an area of the light incident surface 23 is designed to correspond to an area of the light-emitting surface 41, such that lights emitted from the light-emitting surface 41 all enter each light-guiding block 2. In other words, lights emitted by each LED 4 are emitted through the light-emitting surface 41, and then incident into each light-guiding block 2 through the light incident surface 23 of each light-guiding block 2 to transmit.

In the above implementation, referring to FIG. 6 to FIG. 9, each light-guiding block 2 further includes a light outlet surface 25, the light outlet surface 25 faces the side edge of the light-guiding glass 1, a projection of the light outlet surface 25 on a plane parallel to the light outlet surface 25 overlaps a projection of the side edge of the light-guiding glass 1 on the plane parallel to the light outlet surface 25, and the light outlet surface 25 is designed to correspond to the side edge of the light-guiding glass 1, such that lights emitting from the light outlet surface 25 are all guided into the light-emitting glass 1. In other words, after being transmitted in each light-guiding block 2, the lights incident from the light incident surface 23 are emitted through the light outlet surface 25 and then all incident into the side edge of the light-guiding glass 1.

Figure 6:
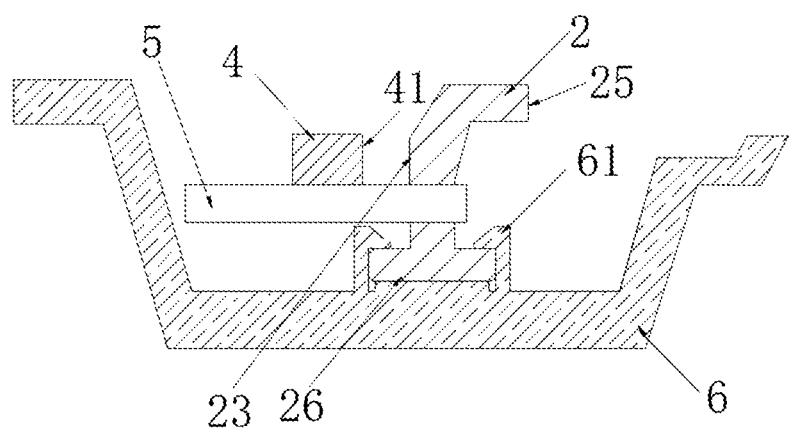
FIG. 6 is a cross-sectional diagram of an ambient glass of the present disclosure.
Figure 7:
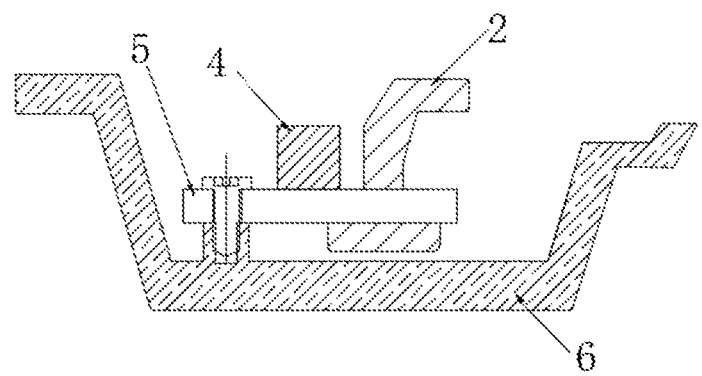
FIG. 7 is a cross-sectional diagram of another ambient glass of the present disclosure.
Figure 8:
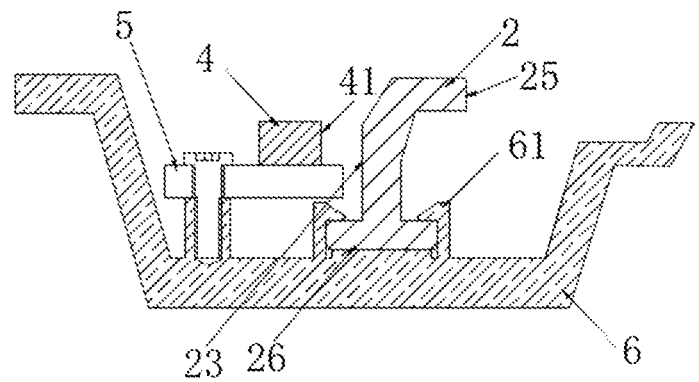
FIG. 8 is a cross-sectional diagram of yet another ambient glass of the present disclosure.

In a structural solution of each light-guiding block 2, referring to FIG. 6 to FIG. 8, each light-guiding block 2 has a corner structure of 90°. In this case, the at least one curved circuit board 5 is disposed below the curved light-guiding structure 3, and the plane where the surface of the at least one curved circuit board 5 is located can be substantially regarded to be parallel to the light guiding glass 1. In this case, the lights emitted by each LED 4 are incident into each light-guiding block 2 through the light incident surface 23 of each light-guiding block 2, and the lights are dispersed and transmitted in each light-guiding block 2. After being reflected by a reflecting surface 24 of 45°, the lights change a direction and are emitted from the light outlet surface 25 to enter an edge of the light-guiding glass 1 much close to the light outlet surface 25. Each LED 4 and the at least one curved circuit board 5 are disposed below each light-guiding block 2, such that a longitudinal space is made use of and a lateral space at the edge of the light-guiding glass 1 is saved.

Figure 9:
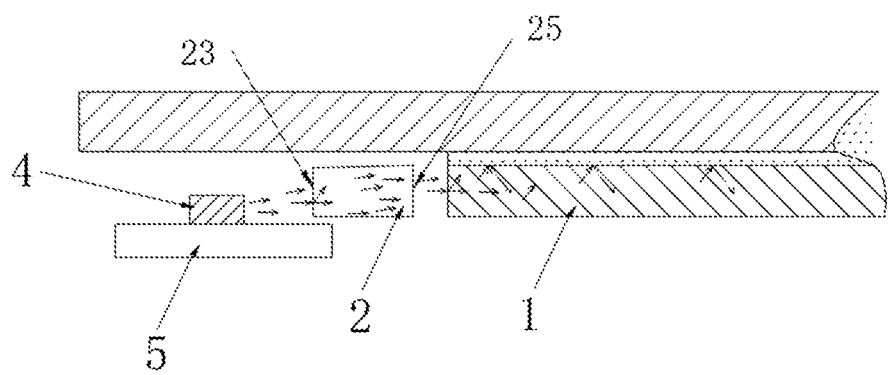
FIG. 9 is a cross-sectional diagram of yet another ambient glass of the present disclosure.

In another structural solution of each light-guiding block 2, referring to FIG. 9, the light incident surface 23 is parallel to the light outlet surface 25, and each light-guiding block 2 is correspondingly designed to have a cuboid structure, such that the lights emitted by each LED 4 can be transmitted to the side edge of the light-guiding glass 1.

It can be understood that in other implementations, each light-guiding block 2 can have a structure in other shapes, which is not limited in the implementations.

Figure 3:
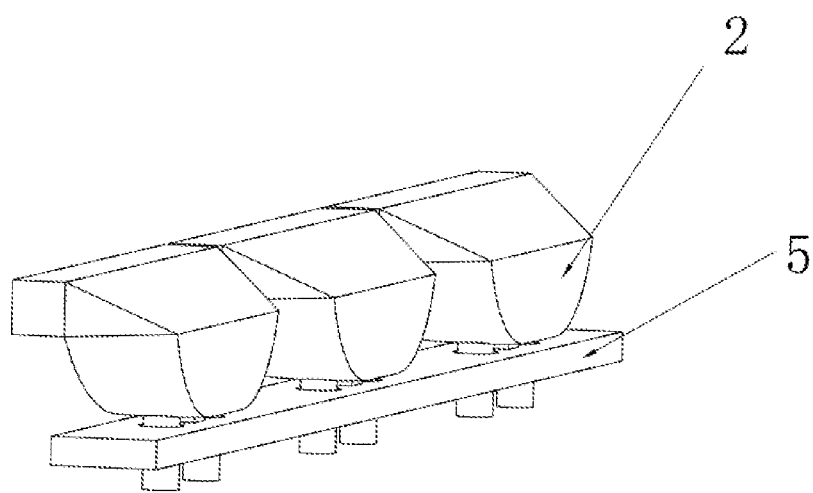
FIG. 3 is a three-dimensional diagram of another light-guiding block of the present disclosure.
Figure 4:
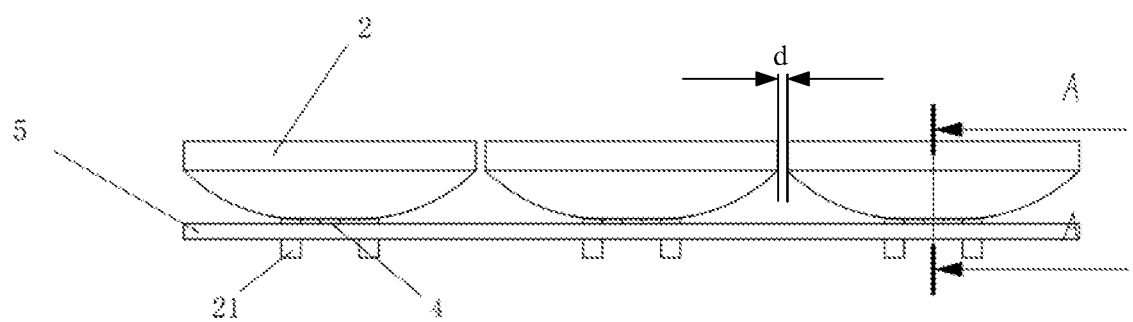
FIG. 4 is a front diagram of another light-guiding block of the present disclosure.
Figure 5:
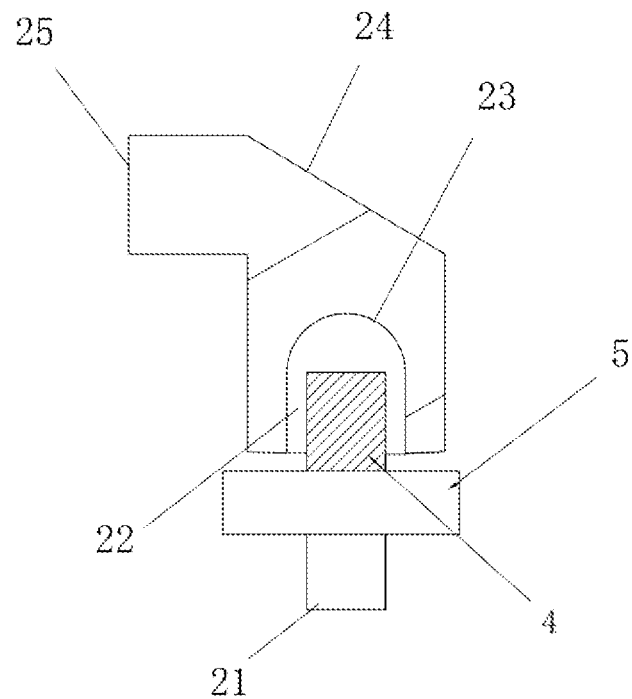
FIG. 5 is a cross-sectional diagram of FIG. 4 of the present disclosure taken along A-A.

Generally, smaller arrangement distance between light-guiding blocks 2 of the implementations is better. However, if two adjacent light-guiding blocks 2 are arranged at a certain distance, although no light-guiding material and LED 4 exist between the two adjacent light-guiding blocks 2, a dark area which may be perceived by human eyes will not exist in a middle area, which is also an acceptable solution. A certain distance between two adjacent light guiding blocks 2 not only can reduce the number of light-guiding blocks 2 used and the number of LEDs 4 used, but also can reduce accuracy requirements when the light-guiding blocks 2 used are arranged and improve efficiency. Therefore, distance d between two adjacent light-guiding blocks 2 is preferably 0-20 mm. Distance d in FIG. 1 of the present disclosure is 20 mm, and distance d in FIG. 3 to FIG. 4 is about 0 mm.

Figure 10:
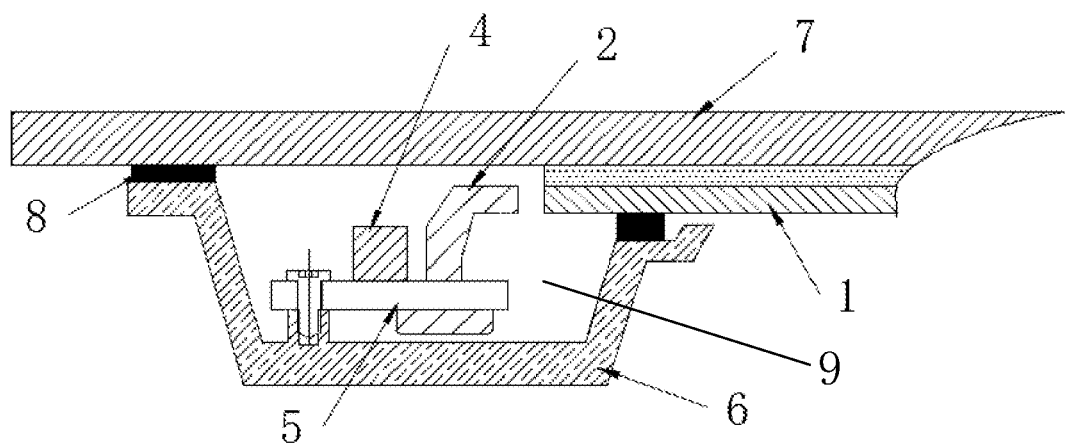
FIG. 10 is a cross-sectional diagram of yet another ambient glass of the present disclosure.

An ambient glass is further provided in the present disclosure, and the ambient glass may be a vehicle sunroof glass, an ambient glass mounted on a building, etc. Referring to FIG. 10, the ambient glass includes a light-guiding glass 1 printed with a reflective pattern and the light source module of any of the above implementations. The light source module is configured to emit uniform lights from a side edge of the light-guiding glass 1 to an interior of the light-guiding glass 1. The reflective pattern may be a printed ink or other materials. Lights emitted by the light source module are homogenized by the multiple light-guiding blocks 2 to be incident into the light-guiding glass 1 and reach the reflective pattern on a glass surface, and then the lights are refracted and emitted, which results in playing a role in adjusting atmosphere. In addition, the ambient glass further includes an exterior glass 7. The exterior glass 7 is stacked with the light-guiding glass 1 and is configured to isolate the light source module from the outside, thereby having a protective function.

In the above implementation, referring to FIG. 10, the ambient glass further includes a cover plate 6. The cover plate 6 is connected with the exterior glass 7 and the light-guiding glass 1 through an adhesive 8, the cover plate 6, the exterior glass 7, and the light-guiding glass 1 cooperatively define an accommodation cavity 9, and the light source module is mounted in the accommodation cavity 9. Referring to FIG. 6, when the LEDs 4 are uniformly distributed on the surface of at least one curved circuit board 5, the multiple light-guiding blocks 2 are fixedly connected with the at least one curved board 5, and the multiple light-guiding blocks 2 are also fixedly connected with the cover plate 6. Referring to FIG. 7, the multiple light-guiding blocks 2 are fixedly connected with the at least one curved circuit board 5, and the at least one curved circuit board 5 is fixedly connected with the cover plate 6. Referring to FIG. 8, all of the multiple light-guiding blocks 2 and the at least curved circuit board 5 are fixedly connected with the cover plate 6. A manner of fixed connection may be clamp connection, screw connection and other fastener connection, or welding and any other fixed manners, which is not limited in the present disclosure.

In the above implementation, referring to FIG. 6 and FIG. 8, the multiple light-guiding block 2 each are provided with a protrusion 26, the cover plate 6 is provided with clamping portions 61, and the protrusion 26 is inserted into each clamping portion 61 to make each light-guiding block 2 fixed to the cover plate 6.

Since the present disclosure adopts the above technical solutions, the present disclosure has following beneficial effects.

The multiple independent light-guiding blocks are combined to constitute the curved light-guiding structure, so a position and an angle of each independent light-guiding block can be adjusted according to curvatures of different light-guiding glasses to adjust the radian of the curved light-guiding structure to match different glasses, such that the multiple light-guiding blocks are universal and different light-guiding strips need not to be developed for different types of atmosphere lights.

The light incident surface of the light-guiding block is designed to match the light-emitting surface of the LED, and the light outlet surface of the light-guiding block is designed to match the side edge of the light-guiding glass. No matter how a relative position of a circuit board and the light-guiding glass changes, the multiple light-guiding blocks can transmit all the lights emitted by the LEDs to the light-guiding glass.

The above description is only to provide a better implementation of the present disclosure, rather than to limit the present disclosure. The present disclosure is not limited to the above examples. Changes, modifications, additions, or replacements made by those of ordinary skill in the art within a substantive scope of the present disclosure also belong to the protection scope of the present disclosure.

What is claimed is:

1. A light source module for an atmosphere light, disposed at an edge of a light-guiding glass and comprising:
 a plurality of light-guiding blocks arranged along a side edge of the light-guiding glass to constitute a curved light-guiding structure, wherein the curved light-guiding structure has a radius matching the side edge of the light-guiding glass;
 light-emitting diodes (LEDs) disposed at at least one end of the curved light-guiding structure, wherein lights emitted by the LEDs are uniformly dispersed by the light-guiding structure to be incident into the light-guiding glass; and
 at least one curved circuit board, wherein the LEDs are uniformly distributed on a surface of the at least one curved circuit board, a number of the LEDs is greater than or equal to a number of the plurality of light-guiding blocks, and the at least one curved circuit board and the curved light-guiding structure are fixed or fixed relative to each other.

2. The light source module for the atmosphere light of claim 1, wherein the plurality of light-guiding blocks each define a concave portion, and each LED protruding from the surface of the at least one curved circuit board is accommodated in the concave portion.

3. The light source module for the atmosphere light of claim 1, wherein the plurality of light-guiding blocks each have a protrusion column, the at least one curved circuit board defines through holes corresponding to columns, and the column of each light-guiding block penetrates through each through hole to make each light-guiding block fixedly connected with the at least one curved circuit board.

4. The light source module for the atmosphere light of claim 1, wherein the at least one curved circuit board is disposed on a surface of the curved light-guiding structure away from the side edge of the light-guiding glass.

5. The light source module for the atmosphere light of claim 1, wherein the at least one curved circuit board is disposed below the curved light-guiding structure.

6. The light source module for the atmosphere light of claim 5, wherein each light-guiding block is configured to deflect a direction of a light entering the light-guiding block by 90° and emit the light deflected out of the light-guiding block.

7. The light source module for the atmosphere light of claim 1, wherein each LED comprises a light-emitting surface, each light-guiding block comprises a light incident surface, and the light incident surface faces the light-emitting surface, and a projection of the light incident surface on a plane parallel to the light-emitting surface overlaps a projection of the light-emitting surface on the plane parallel to the light-emitting surface, to make lights emitted from the light-emitting surface all enter each light-guiding block.

8. The light source module for the atmosphere light of claim 7, wherein each light-guiding block further comprises a light outlet surface, the light outlet surface faces the side edge of the light-guiding glass, and a projection of the light outlet surface on a plane parallel to the light outlet surface overlaps a projection of the side edge of the light-guiding glass on the plane parallel to the light outlet surface, to make lights emitted from the light outlet surface all guided into the light-emitting glass.

9. The light source module for the atmosphere light of claim 1, wherein a distance between two adjacent light-guiding blocks is 0~20 mm.

10. An ambient glass, comprising:
 a light-guiding glass; and
 a light source module comprising:
 a plurality of light-guiding blocks arranged along a side edge of the light-guiding glass to constitute a curved light-guiding structure, wherein the curved light-guiding structure has a radius matching the side edge of the light-guiding glass; and
 light-emitting diodes (LEDs) disposed at at least one end of the curved light-guiding structure, wherein lights emitted by the LEDs are uniformly dispersed by the light-guiding structure to be incident into the light-guiding glass; wherein the LEDs are configured to emit uniform lights from an edge of the light-guiding glass to an interior of the light-guiding glass.

11. The ambient glass of claim 10, further comprising:
 a cover plate, wherein
 when the LEDs are uniformly distributed on a surface of at least one curved circuit board, the plurality of light-guiding blocks are fixedly connected with the at least one curved circuit board, and the plurality of light-guiding blocks or the at least one curved circuit board is fixedly connected with the cover plate; or
 all of the plurality of light-guiding blocks and the at least one curved circuit board are fixedly connected with the cover plate.

12. The ambient glass of claim 11, further comprising:
 an exterior glass stacked with the light-guiding glass.

13. The ambient glass of claim 12, wherein the cover plate is connected with the exterior glass and the light-guiding glass through an adhesive.

14. The ambient glass of claim 13, wherein the cover plate, the exterior glass, and the light-guiding glass cooperatively define an accommodation cavity, and the light source module is mounted in the accommodation cavity.

15. The ambient glass of claim 11, wherein the plurality of light-guiding blocks each are provided with a protrusion, the cover plate is provided with clamping portions, and the protrusion is inserted into each clamping portion to make each light-guiding block fixed to the cover plate.

16. The ambient glass of claim 10, wherein the LEDs are uniformly distributed on a surface of at least one curved circuit board, a number of the LEDs is greater than or equal to a number of the plurality of light-guiding blocks, and the at least one curved circuit board and the curved light-guiding structure are fixed or fixed relative to each other.

17. The ambient glass of claim 16, wherein the plurality of light-guiding blocks each define a concave portion, and each LED protruding from the surface of the at least one curved circuit board is accommodated in the concave portion.

18. The ambient glass of claim 16, wherein the plurality of light-guiding blocks each have a protrusion column, the at least one curved circuit board defines through holes corresponding to columns, and the column of each light-guiding block penetrates through each through hole to make each light-guiding block fixedly connected with the at least one curved circuit board.

19. The ambient glass of claim 10, wherein each LED comprises a light-emitting surface, each light-guiding block comprises a light incident surface, and the light incident surface faces the light-emitting surface, and a projection of the light incident surface on a plane parallel to the light-emitting surface overlaps a projection of the light-emitting surface on the plane parallel to the light-emitting surface, to make lights emitted from the light-emitting surface all enter each light-guiding block.

* * * * *

UNITED STATES PATENT AND TRADEMARK OFFICE
CERTIFICATE OF CORRECTION

| | | |
|---|---|---|
| PATENT NO. | : 11,789,197 B2 | Page 1 of 1 |
| APPLICATION NO. | : 17/978265 | |
| DATED | : October 17, 2023 | |
| INVENTOR(S) | : Bingming Jiang et al. | |

It is certified that error appears in the above-identified patent and that said Letters Patent is hereby corrected as shown below:

On the Title Page

Add item (30), Foreign Application Priority Data:
May 12, 2020 (CN) 202010395904.4

Signed and Sealed this
First Day of October, 2024

Katherine Kelly Vidal
*Director of the United States Patent and Trademark Office*